United States Patent [19]
Tsai

[11] Patent Number: 5,900,951
[45] Date of Patent: May 4, 1999

[54] CONTACT IMAGE SENSOR IMAGE READING APPARATUS

[75] Inventor: Jenn-Tsair Tsai, Taoyuan Hsien, Taiwan

[73] Assignee: Mustek Systems Inc., Taiwan

[21] Appl. No.: 08/916,944

[22] Filed: Aug. 25, 1997

[30] Foreign Application Priority Data

Mar. 26, 1997 [TW] Taiwan ................................. 86203526

[51] Int. Cl.⁶ ..................................................... H04N 1/04
[52] U.S. Cl. ........................... 358/497; 358/494; 358/474
[58] Field of Search ..................................... 358/497, 494, 358/474, 471, 400, 401; 250/208.1

[56] References Cited

U.S. PATENT DOCUMENTS 5,504,586  4/1996  Garcia et al. ........................... 358/400
5,610,731  3/1997  Itoh ......................................... 358/497
5,801,851  9/1998  Sheng ...................................... 358/497

*Primary Examiner*—Edward L. Coles
*Assistant Examiner*—Cheukfan Lee
*Attorney, Agent, or Firm*—Sughrue, Mion, Zinn, Macpeak & Seas, PLLC

[57] ABSTRACT

Disclosed is a CIS (contact image sensor) scanner which apples a CIS module with two bracket arms for assuring a document sheet in focus. The CIS module is mounted on a pair of shafts. Each shaft is rested on a pair of shaft bearings. At each shaft bearing, there is a rigid body interposed between the shaft and the document sheet. Inside each shaft bearing, there is an elastic element under the shaft for uplifting the CIS module to press the rigid body firmly onto the bottom surface of the sheet table. The rigid body and the elastic elements can help to maintain a stable distance between the sheet table and the CIS module, thereby improving the picture quality of images.

18 Claims, 1 Drawing Sheet

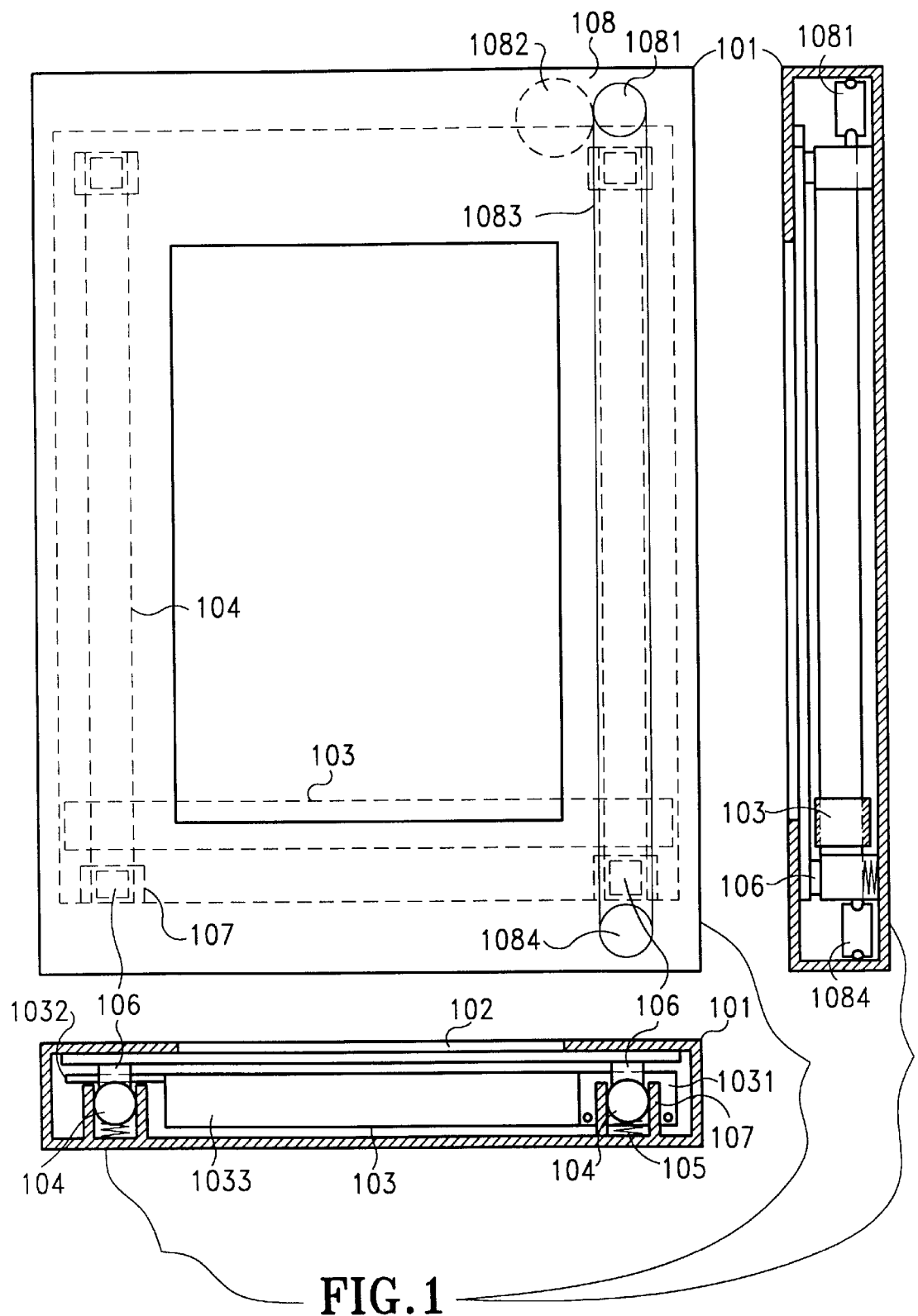

CONTACT IMAGE SENSOR IMAGE READING APPARATUS

BACKGROUND OF THE INVENTION

1. Field of the Invention

The present invention relates to a CIS (Contact Image Sensor) flatbed scanner, especially to a CIS scanner having an improved structure for a CIS module that can assure a document sheet in focus and reduce the size of the scanner.

2. Description of the Prior Art

A conventional flatbed scanner preferably uses a CCD line sensor for reading the image information from a sheet because the CCD line sensor can provide stable and good picture quality of images. The trade-off for using a CCD line sensor is that the size of the flatbed scanner is restricted by the light path required for the CCD line sensor. For this reason, the size of the flatbed scanner can hardly be reduced in a great scale even with the aid of mirror arrays to reflect the light beams.

Recently, a new approach is trying to replace a CCD line sensor with a CIS contact sensor for producing low-end flatbed scanners. An advantage for this new approach is that it can save a lot of time and efforts in assembly and maintenance because a CIS contact sensor is modularized. All the necessary optical elements, such as mirrors, light source and a photoelectric converting device, are included in a compact module. Thus, a CIS module can help to simplify the inner structure of a scanner. Moreover, a CIS contact sensor is smaller and lighter than a CCD line sensor. With a CIS contact sensor, the scanner can be portable with height around 30 mm.

Nevertheless, this new approach did not prevail. The main reason is because the scene depth of a CIS contact sensor is only about 0.3 mm. Based on the structure of a conventional flatbed scanner, it is very difficult to assure a document sheet in focus. Even a small manufacture error or structure distortion will affect the picture quality of the images.

SUMMARY OF THE INVENTION

Accordingly, it is an object of the present invention to provide a scanner having a new structure of the CIS (Contact Image Sensor) module for assuring a document sheet in focus, thereby improving the picture quality of images.

It is another object of the present invention to provide a new CIS module which has two bracket arms for smoothing its movement on the shafts and reducing the size of the CIS scanner.

It is a further object of the present invention to provide a CIS scanner which is simple in structure and easy to assemble, thereby reducing the manufacture cost and maintenance fee.

The present invention discloses a CIS scanner which applies a CIS module of new structure for assuring a stable distance between a document sheet and the CIS module. The CIS module is mounted on a pair of shafts. Each shaft is rested on a pair of shaft bearings. At each shaft bearing, there is a rigid body on top of the shaft for leaving a space between the CIS module and the document sheet. And inside each shaft bearing, there is an elastic element under the shaft for uplifting the CIS module to press the rigid body firmly onto the bottom surface of the sheet table. The rigid body and the elastic elements can help to maintain a stable distance between the sheet table and the CIS module, thereby improving the picture quality of images.

BRIEF DESCRIPTION OF THE DRAWINGS

These and other objects and advantages of the present invention will become apparent by reference to the following description and accompanying drawings wherein:

FIG. 1 is a perspective top view and side view schematically showing the structure of the preferred embodiment of the invention.

DETAILED DESCRIPTION OF THE PREFERRED EMBODIMENTS

A preferred embodiment of the invention are described below. This embodiment is merely exemplary. Those skilled in the art will appreciate that changes can be made to the disclosed embodiment without departing from the spirit and scope of the invention.

The invention can be illustrated clearly in FIG. 1. FIG. 1 shows a perspective top view, front view and side view of the preferred embodiment of the invention. From the front view, we can see a sheet table 102 on top the housing 101 for placing a document sheet. The sheet table 102 is made of glass or translucent material. A CIS Contact Image Sensor module 103 has two bracket arms, one is a plane support 1032, the other shaft bracket 1031. The CIS module 103 comprises a light source, mirrors, and photoelectric converting devices for converting image information into electric signals. Under the bracket arms of the CIS module 103, there are two shafts 104 for guiding and supporting the CIS module 103. The reason why the bracket arms of the CIS module are designed this way is because the plans support 1032 allows the CIS module 103 to move more freely on the shaft 104 thereby reducing the vibration of the CIS module 103. If both bracket arms are shaft brackets, the vibration of the CIS module 103 is likely to increase because the CIS module 103 is dragged from one side. This unbalance will cause the bracket arms of the CIS module 103 to hit shafts 104 occasionally while the CIS module 103 is dragged along the sheet table 102. The shafts 104 can be a pair of slide shafts or guide bars.

At the opposite ends of each shaft 104, there are a pair of shaft bearings 107. The shaft bearings 107 are fixed on the inner bottom of said housing 101 for supporting the shafts 104. At the shaft bearings 107, there is a rigid body 106 interposed between the shaft 104 and the sheet table 102. The rigid body 106 can be a spacer which is cut in precision for leaving a space between the CIS module 103 and the sheet table 102. The height of the rigid body 106 determines the distance between the sheet table 102 and the CIS module 103. Thus, altering the height of the rigid body 106 can adjust the distance between the sheet table 102 and the CIS module 103. Inside each of the shaft bearings 107, there is an elastic element 105 beneath the shaft 104. The elastic element 105 can be a spring, rubber or a spring support. It helps to uplift the shaft 104 to press the rigid body 106 firmly onto the bottom surface of the sheet table 102. It shall be noted that the shafts 104 are not fixed on the shaft bearings 104. Instead, the shafts 104 can adjust its position via the elastic elements 105. If there is any minor manufacture errors or distortions, the distance between the sheet table 102 and the CIS module 103 remains the same because the shafts 104 are pressed firmly onto the sheet table 102 by the elastic elements 105. The relative positions of the shafts 104, elastic elements 105, rigid body 106 and the CIS module 103 are more clearly illustrated in the perspective side view.

The CIS module 103 is driven by a driving device 108. The driving device 108 includes a driving motor 1082, a pulley set 1081,1084, and a conveying element 1083. The pulley sets 1081, 1084 locates at the opposite ends of the shaft 104. The conveying element 1083 is a timing belt or a steel wire rope in a shape of a loop. The conveying element 1083 surrounds the pulley set 1081, 1084 and connects to the shaft bracket 1031 of the CIS module 103. When the motor 1082 is enabled, it drives the pulley 1081 which further rotates the conveying element 1083 and pulley 1084. When the conveying element 1083 is driven, the CIS module 103 will be dragged to the opposite side of the sheet table 102 at the same time. The CIS module 103 will then read the image information from the document sheet while moving along the sheet table 102.

The primary difference between the invention and the prior art lies in where the shafts are fixed to. The shafts of the prior art are fixed onto the bottom of the housing. Since the manufacture errors or distortions cannot be completely prevented, the distance between the document sheet and the sheet table will be difficult to control. That explains why the image quality of the CIS scanner is not stable. On the contrary, the invention let the shafts 104 to fix onto the sheet table 102. With the adjustment of the elastic elements 105 and the rigid body 106, the distance between the sheet table 102 and the CIS module 103 will be easy to control. Thus, the picture quality of the images will be stable. Moreover, the structure of the invention is simple and easy to implement. It will definitely reduce the manufacture cost and maintenance fee.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A CIS (Contact Image Sensor) image information reading apparatus comprising:

a housing;

a sheet table on top of said housing for placing a document sheet;

a CIS (Contact Image Sensor) module with two bracket arms disposed beneath the bottom surface of said sheet table;

a pair of shafts for supporting said CIS module from said bracket arms of said CIS module;

a plurality of shaft bearings fixed on the inner bottom surface of said housing for supporting said pair of shafts from its opposite ends;

a plurality of rigid bodies interposed between the top surface of said shafts and the bottom surface of said sheet table; and driving means coupling to said CIS module for driving said CIS module to reciprocally move on said pair of shafts.

2. The apparatus as claimed in claim 1, further comprising:

a plurality of elastic elements installed inside each of said shaft bearings and beneath said shafts.

3. The apparatus as claimed in claim 2, wherein said elastic elements are springs, rubber or spring supports.

4. The apparatus as claimed in claim 1, wherein at least one bracket arm of said CIS module is a shaft bracket.

5. The apparatus as claimed in claim 4, wherein the other bracket arm of said CIS module is a plane support.

6. The apparatus as claimed in claim 1, wherein said sheet table is made of glass.

7. The apparatus as claimed in claim 1, wherein said shafts are guide bars or slide shafts.

8. The apparatus as claimed in claim 1, wherein said rigid body is a spacer.

9. The apparatus as claimed in claim 1, wherein said driving means comprising:

a pair of pulleys each locating at the opposite ends of said shafts;

conveying means surrounding said pulleys in a shape of a loop and connecting to said CIS module; and a driving motor for rotating one of said pulleys.

10. The apparatus as claimed in claim 9, wherein said conveying means is a steel wire rope or a timing belt.

11. A CIS (Contact Image Sensor) image information reading apparatus comprising:

a housing;

a sheet table on top of said housing for placing a document sheet;

a CIS (Contact Image Sensor) module with a shaft bracket and a bracket arm disposed beneath the bottom surface of said sheet table;

a pair of shafts for supporting said CIS module from said shaft bracket and said bracket arm of said CIS module;

a plurality of shaft bearings fixing on the inner bottom surface of said housing for supporting said pair of shafts from its opposite ends;

a plurality of rigid bodies interposed between the top surface of said shafts and the bottom surface of said sheet table;

a plurality of elastic elements inserted in said shaft bearings and beneath said shafts; and driving means coupling to said CIS module for driving said CIS module to reciprocally move on said pair of shafts.

12. The apparatus as claimed in claim 11, wherein said sheet table is made of glass.

13. The apparatus as claimed in claim 11, wherein said shafts are guide bars or slide shafts.

14. The apparatus as claimed in claim 11, wherein said elastic elements are springs, rubber or spring supports.

15. The apparatus as claimed in claim 11, wherein said rigid body is a spacer.

16. The apparatus as claimed in claim 11, wherein said bracket arm of said CIS module is a plane support.

17. The apparatus as claimed in claim 11, wherein said driving means comprising:

a pair of pulleys each locating at the opposite ends of said shafts;

conveying means surrounding said pulleys in a shape of a loop and connecting to said CIS module; and a driving motor for rotating one of said pulleys.

18. The apparatus as claimed in claim 17, wherein said conveying means is a steel wire rope or a timing belt.

* * * * *